April 9, 1935.  E. H. ALLEN  1,997,095
TRAILER SUPPORT
Filed Aug. 14, 1933  4 Sheets-Sheet 1
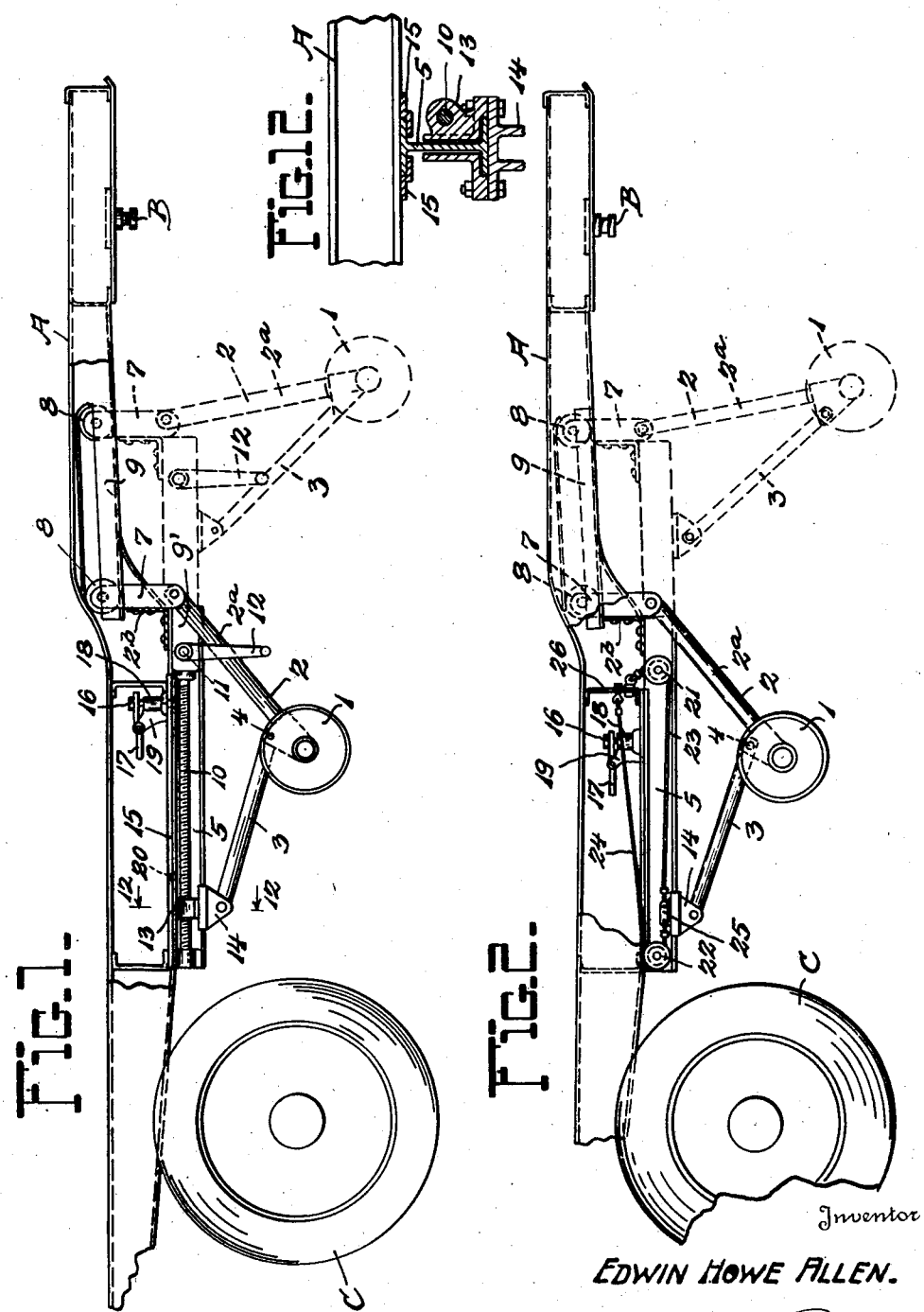
Inventor
EDWIN HOWE ALLEN.
By Robb & Robb
Attorneys April 9, 1935.  E. H. ALLEN  1,997,095
TRAILER SUPPORT
Filed Aug. 14, 1933   4 Sheets-Sheet 2
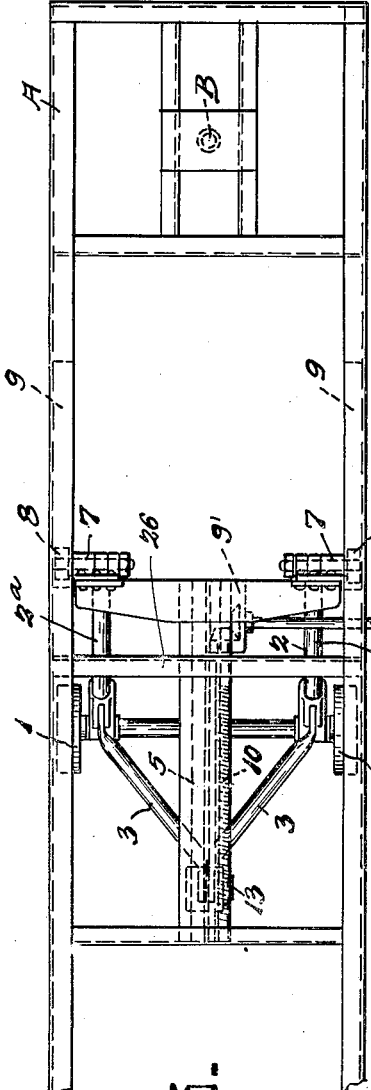
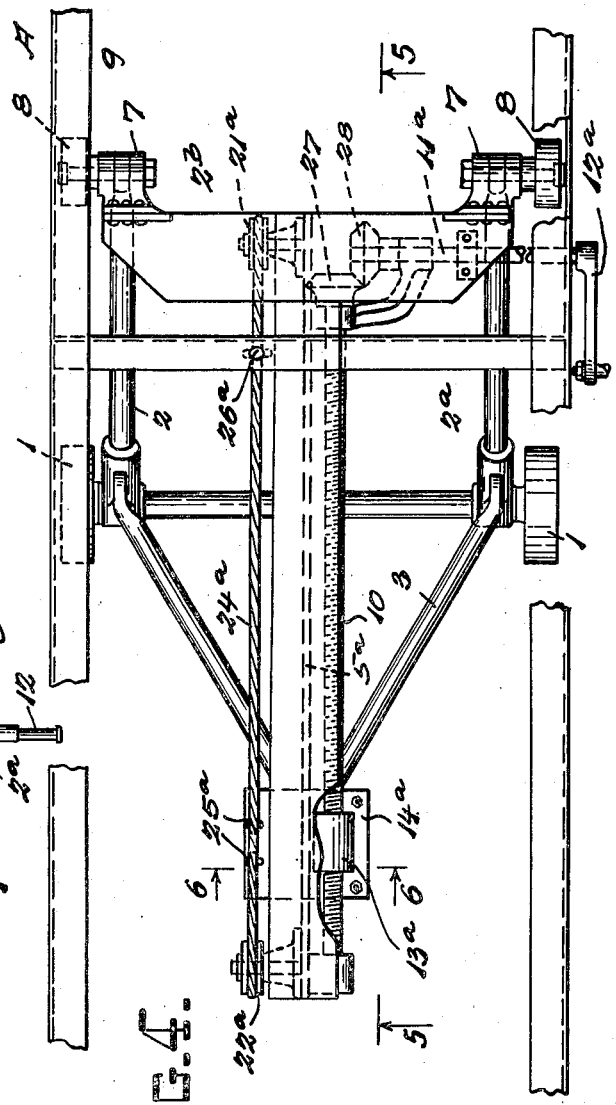
Inventor
EDWIN HOWE ALLEN.
By Robb&Robb
Attorneys

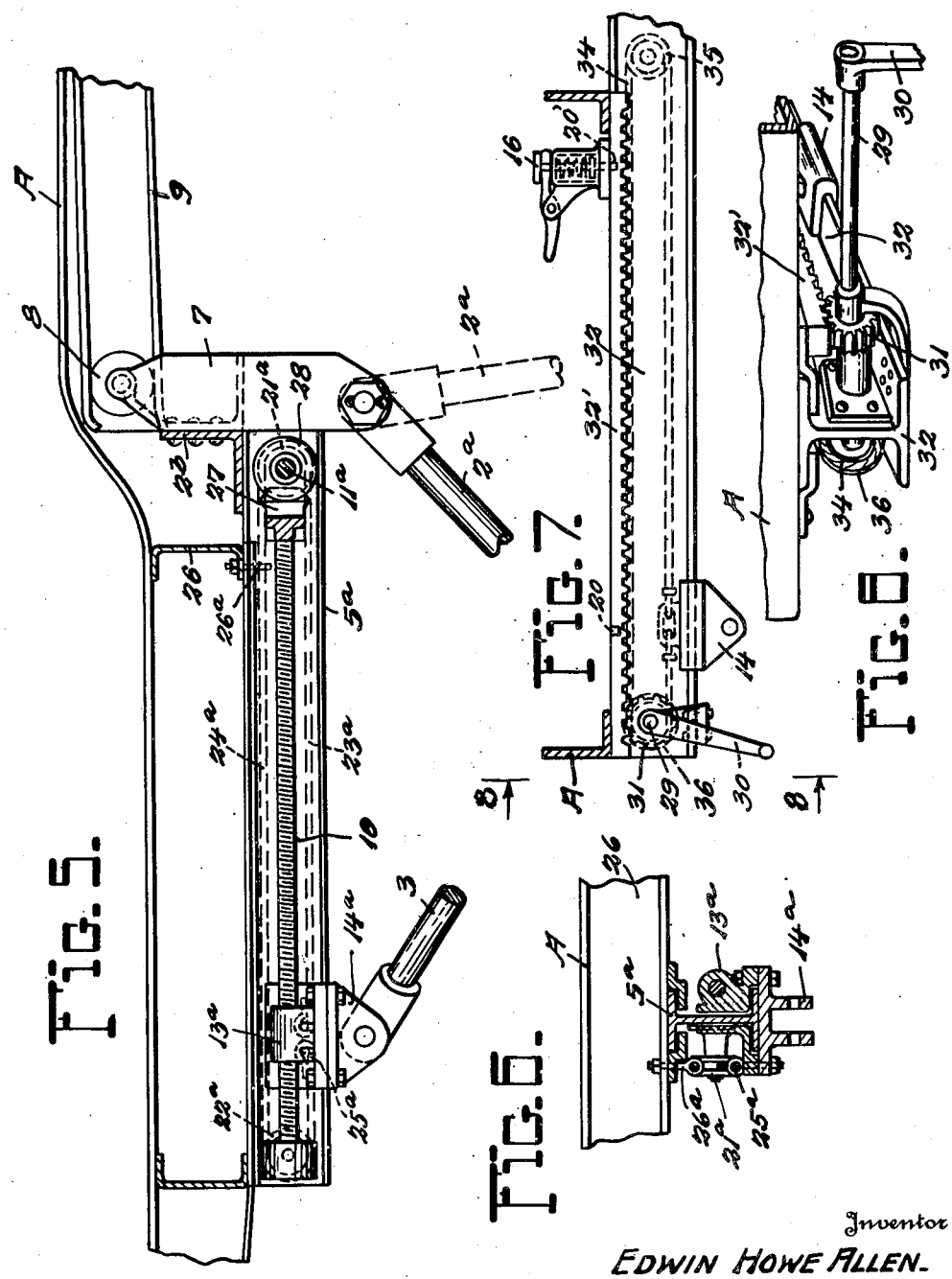

April 9, 1935.　　　　E. H. ALLEN　　　　1,997,095
TRAILER SUPPORT
Filed Aug. 14, 1933　　4 Sheets-Sheet 4
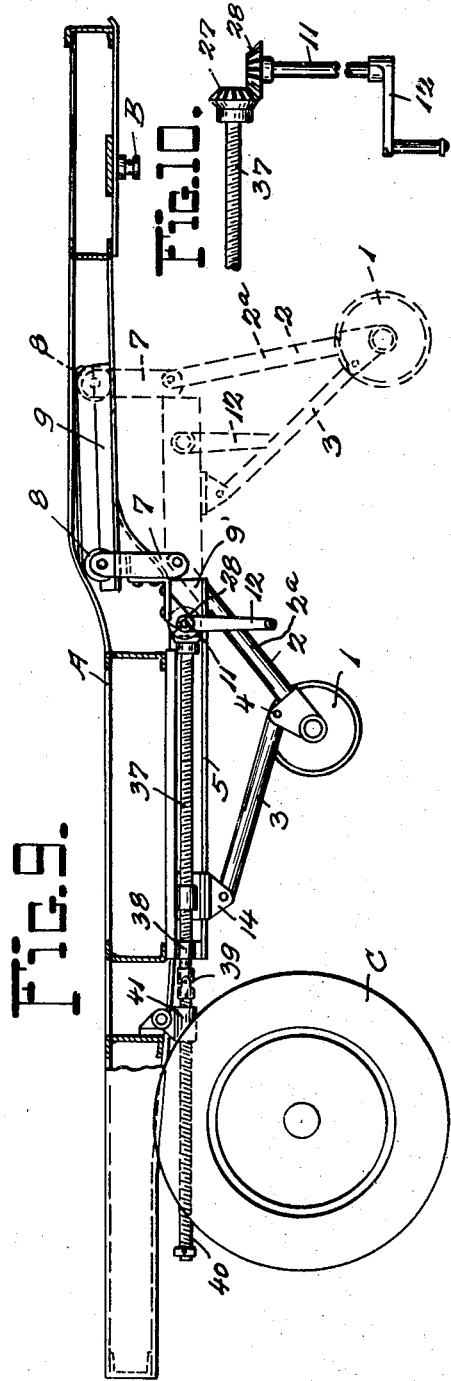
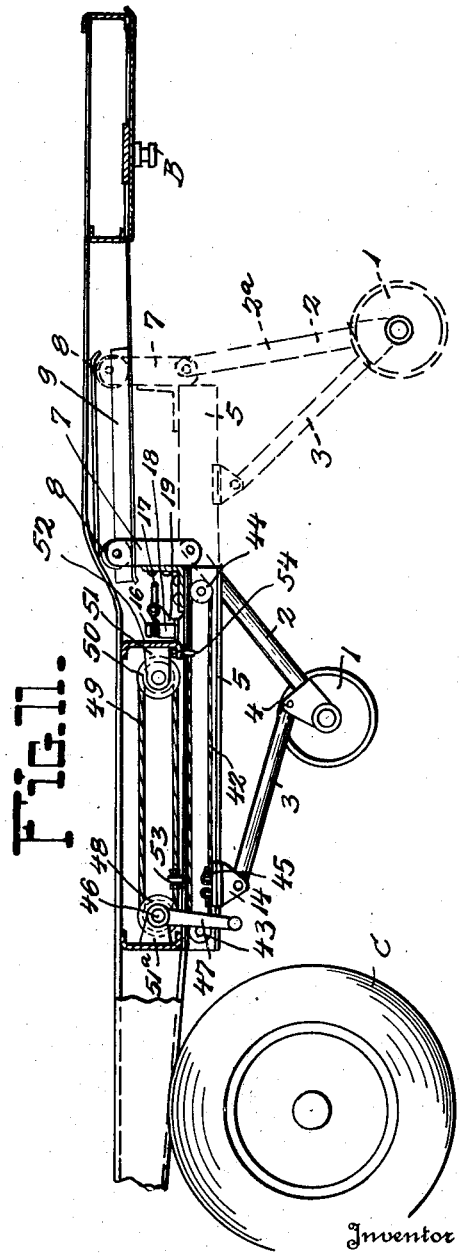
Inventor
EDWIN HOWE ALLEN.
Attorneys Patented Apr. 9, 1935

1,997,095

UNITED STATES PATENT OFFICE 1,997,095

TRAILER SUPPORT

Edwin Howe Allen, Edgerton, Wis., assignor to Highway Trailer Company, Edgerton, Wis., a corporation Application August 14, 1933, Serial No. 685,099

15 Claims. (Cl. 280—33.1)

This invention comprises certain new improvements in trailer vehicles such as are at present commonly used in tractor-trailer vehicle combinations. Trailers of this type comprise a chassis or frame having two rear wheels upon which the main portion of the pay-load in the trailer is carried during travel. For supporting the front end of the trailer when the tractor vehicle is disconnected therefrom, a wheeled support is commonly used and is adjustable either manually or automatically, according to the type of trailer, so that when the trailer is travelling behind the tractor, this support provides a clearance between its wheels and the ground or grade level.

The primary objective of this invention is to design a type of wheeled support for the front portion of the trailer with provisions for not only lowering and raising the support manually, or otherwise, to afford the clearance above mentioned, but additional provisions whereby the support is moved bodily forwards and rearwards relatively to the front end of the trailer.

The forward movement of the support when it is lowered to its operative position with its wheels on the ground is desirable in order to carry the support as near as possible to the front end of the trailer for preventing any possible tilting forwardly of the trailer when it is loaded while stationary and disconnected from the tractor vehicle used to pull it on the road.

In carrying out my invention, a number of different modifications thereof may be employed, wherein the movement of the support bodily forward on the trailer frame may be accomplished by different kinds of mechanisms, and furthermore, may be accomplished incidental to or simultaneously with the movement by which the support is lowered to the ground, or the said operations may be performed independently. In other words, the manual raising and lowering of the support for the front end of the trailer may be accompanied by an automatic incidental operation of the support to carry the latter rearwardly and forwardly, respectively, upon the trailer frame, or these operations may be performed independently one of the other, according to certain construction.

A full understanding of my invention, and its various adaptations, will be had upon reference to the following description and to the accompanying drawings, in which:—

Figure 1 is a partial side view and partial sectional view of a separate embodiment of my invention as applied to a trailer, dotted lines showing the support in its lowered position and moved bodily forward.

Figure 2 is a similar view of a modification of the invention wherein a cable means is employed for actuation of the support instead of a screw means as in Figure 1.

Figure 3 is a top plan view of the construction of Figure 1.

Figure 4 is a fragmentary top plan view partially broken away of a further modification of the invention.

Figure 5 is a partial side view and partial sectional view of the construction of Figure 4, taken about on the line 5—5 of Figure 4.

Figure 6 is a fragmentary cross sectional view taken about on the line 6—6 of Figure 4.

Figure 7 is a fragmentary side view of a further modification of the invention employing a rack actuating means for the support.

Figure 8 is a perspective view of certain operating parts shown in Figure 7.

Figure 9 is a view similar to Figure 1, illustrating a modification in which the manual operation of the support to lower the same automatically or simultaneously produces a bodily forward movement of the support.

Figure 10 is a fragmentary view showing in top plan certain of the gear parts of Figure 9.

Figure 11 is a view similar to Figure 9 of the same general type of apparatus as to working action, but differently constructed.

Figure 12 is a sectional view taken on the line 12—12 of Figure 1.

Referring now to the construction of my invention in Figures 1 and 12, A denotes the chassis or frame of the trailer, B its king pin near the front end thereof for coupling with the tractor vehicle coupling means, and C the rear wheels of the trailer. The trailer support is somewhat of known design involving the supporting wheels 1, the hanger frame 2, and the push and pull frame 3, the frame 2 rigid with the axis supporting means of the wheels 1 and the frame or bar member 3 being pivoted thereto at 4. Slidable on the under side of the trailer A is a carrier member in the form of an I beam 5.

The carrier member 5 supports, at its front end, the hanger frame 2, which includes spaced bars 2a and a cross plate 2b with which the front end of the carrier member 5 is rigidly connected. The cross plate 2b is in the form of an angle plate pivoted or secured at its horizontal portion to the carrier 5, the latter being practically a sliding I beam. Fastened to the cross plate 2b on the vertical angle thereof are the vertical roller standards 7 which carry rollers 8 sliding in roller-ways 9 provided in the channel portions of the sides of the frame or chassis A of the trailer. The connection between the side members 2a of the frame 2 and the cross plate 2b may be established with the lower ends of the standards 7. Mounted on a side of the carrier or slide 5 is a gear housing 9', see Figure 3, which receives the front end of a screw shaft 10 and beveled gears, such as commonly provided for turning the screw shaft 10 at present employed on trailers for raising and lowering the supporting wheels 1. An operating cross shaft 11 with its crank handle 12 is availed of according to usual practise whereby to manually turn the screw shaft 10 and move the screw slide 13 forwardly or rearwardly dependent upon the direction of rotation of the shaft 10. Said slide 13 carries the hanger bracket 14 to which the rear ends of the push and pull frame 3 are pivoted.

The operation of the parts as above set forth is as follows. Assuming that the wheeled support for the front end of the trailer is in the full line position of Figure 1, the operator turns the crank handle 12, the shaft 11 and the screw shaft 10, thereby advancing the screw slide 13 forwardly in the usual manner, thus lowering the supporting parts 1, 2 and 3. Before the above operation, the slide or carrier 5 will be manually pushed forward so that it assumes the position of the dotted lines in Figure 1, the rollers 8 traveling forwardly in the roller-ways 9 and the member 5 sliding forward in the guides 15 attached to the underside of the trailer frame A, as shown in Figure 12 most clearly. Of course, any suitable means may be provided for manually actuating the carrier or slide member 5, but according to the construction of Figures 1, 3 and 12, this would be done by merely getting under the chassis A and pushing the said carrier forwards to advance the support means 1, 2 and 3 bodily toward the king pin B. A short cable could be attached to the front end of the carrier 5 and pulled forwardly by the operator, if it is not desired to get under the trailer in order to actuate the member 5; or, a lever may be mounted upon the chassis A pivoted intermediate its ends with its inner end attached to the slide or carrier 5 and its outer end projecting from a side of the chassis whereby to shift the member 5 forwards. The particular actuating means for the carrier by which the supporting parts 1, 2 and 3 are bodily shifted forwards is not material in the above connection as so many different kinds of mechanical devices might be used for this purpose. In order to lock the carrier 5 forward in the dotted line position of Figure 1, there is provided a locking mechanism including the locking plunger 16, the lever 17 for lifting said plunger and a casing 18 for the plunger having a bracket 19 to which the lever 17 is pivoted. Recesses or openings 20 in the carrier 5 may be entered by the plunger 16 to afford the locking action of the plunger respecting said member 5. Lever 17 may be suitably extended through the side of the trailer frame or otherwise to any convenient point to facilitate operation of the plunger lock.

The modification of the invention shown in Figure 2 embodies a construction which is substantially the same as to many parts, as the construction above set forth, and those parts which are similarly made and mounted are referred to by the same reference characters as have been heretofore used. In the construction of Figure 2, the means for lowering the supporting wheels 1 is automatically actuated instead of being manually operated, as in the previous construction set forth. The carrier 5 is manually moved forwardly and rearwardly as desired in the same way as previously set forth. Said carrier 5, however, carries a front grooved roller 21 and a rear grooved roller 22 about which pass cable elements 23 and 24 respectively. The cable element 23 is attached at 25 to the bracket 14 pivotally connected with the push and pull frame 3. The cable element 24 is likewise attached to said bracket 14, after passing around the pulley or roller 22 and, at its opposite end, is attached to a stationary cross piece 26 of the chassis frame A. The end of the cable element 23 opposite that secured to the bracket 14 is likewise attached to the stationary frame member 26. According to the above construction, when the carrier 5 is manually pushed forward to the dotted line position of Figure 2, the cable element 23 will travel forwardly around the pulley or roller 21 and the cable element 24 will travel rearwardly over the pulley or roller 22, this action of the cable elements causing the bracket 14 to move forwardly on the carrier 5 and shift the supporting wheels 1 to their lowered dotted line position of Figure 2.

The modification in Figure 4 utilizes certain parts that have been previously described, but in this construction, manually actuated shaft means is availed of for moving the slidable bracket 14a and screw slide 13a. The slide 13a is mounted to move along the screw 10 actuated by the beveled gear 27 meshing with the beveled gear 28 on the manual shaft 11a shown carrying the crank handle 12a. The modified form of carrier of Figures 4 and 5 is designated 5a and is moved forwardly and rearwardly by turning the shaft 11a, as previously indicated. At its front end the carrier 5a is equipped with a pulley or grooved roller 21a, and at its rear end, it is equipped with a grooved roller 22a mounted on the carrier 5a in substantially the same manner as the rollers 21 and 22 are mounted on the carrier 5 in Figure 2. A cable means 24a passes around the pulleys 21a and 22a and is anchored at 26a to the trailer frame and at 25a to the screw slide 13a.

By operating the shaft 11a of the construction of Figures 4 and 5, the wheeled supporting means 1 may be raised and lowered. Simultaneously with the lowering of the wheels 1, the carrier or slide 5a will be bodily moved forward to a position equivalent to the dotted line position in Figure 1, and simultaneously with the rearward elevating of the wheels 1 to carry them into their clearance position respecting the ground, the carrier 5a will be shifted rearwardly for purposes previously set forth herein. The construction of the parts shown in Figures 4 and 5 is more clearly to be seen in the sectional view of Figure 6, which is taken on the line 6—6 of Figure 4. A lock for the slide 5a is not necessary in this construction.

Figures 7 and 8 illustrate still another modified adaptation of the invention in part, i. e., in this construction the manual actuating shaft 29 with its crank handle 30 is adapted to rotate a pinion gear 31 meshing with a toothed rack 32' attached to the chassis frame. The shaft 29 and its pinion gear are mounted in suitable bearing and supporting means attached to the rear end of the carrier 32 on which the supporting parts for the wheeled portion 1, disclosed in previous figures of the drawings, are mounted. By turning the shaft 29 contra-clockwise, as illustrated in Figures 7 and 8, the carrier 32 will be moved forwardly, and when at its forward position, it may be locked by the same locking mechanism as described in reference to Figures 1 and 2.

In this construction also there is provided a cable element 34 passing around pulleys 35 and 36, the pulley 36 being coaxial with the shaft 29 and keyed thereto, and said cable means is connected to the slide bracket 14 of the kind previously described whereby to shift said slide bracket forward and lower the supporting wheels 1 when the carrier 32 is moved forwardly, and whereby to shift the supporting wheels 1 upwardly when the carrier 32 is moved rearwardly.

It is notable that the opening 20 of the carrier 5 of the first described construction, is reproduced in the construction of Figure 7, for cooperation with the lock mechanism that locks the carrier forwardly. When the carriers 5 or 32, as the case may be, are in their rearward position, the lock mechanism including the plunger 16, cooperates with an opening 20' near the forward end of the carrier to lock the carrier in its rearward position.

Passing now to the modification of the invention in Figures 9 and 10, the carrier construction and the parts of the supporting means which carries the wheels 1 are substantially as previously described with the exception that the screw shaft 37 passes through a bearing member 38 at the rear end of the carrier and is connected by universal joint 39 with a second screw shaft 40. The screw shaft 40 is threaded in an opposite direction from the threading of the screw shaft 37 and screw shaft 40 passes through an internally threaded bracket 41 attached to the chassis or frame A. By turning the crank handle 12 in Figure 9, and the shaft 11, the screw 37 will simultaneously propel the bracket 14 forwardly to lower the wheels 1 and bodily push the carrier 5 forwardly to bodily shift the entire support comprising the parts 1, 2 and 3 toward the king pin B of the trailer. Upon reversing the turning of the shaft 11 by the crank 12, the said parts will be simultaneously moved to elevate the supporting means 1, 2 and 3, and shift said supporting means bodily in a rearward direction as clear from the drawings. In view of the fact that I use the screws 37 and 40, no special locking means for the carrier 5 is needed because the screw means is self locking.

In the modification of Figure 11 of my invention, the actuation of the carrier 5 and supporting means 1, 2 and 3 bodily, is simultaneously performed as is true in respect to the construction of Figures 9 and 10, along with the lowering and raising of the wheels 1. The carrier 5, to the above end, is provided with cable means 42 passing about pulleys 43 and 44, carried by said carrier 5. The lower lap of the cable means 42 is anchored to the bracket 14 at 45. The carrier 5 is shifted forwardly and rearwardly in this construction by direct action through a manually actuated shaft 46 having the crank 47, said shaft 46 carrying the rear pulley 48, around which the upper cable means 49 passes, said cable means likewise passing over a pulley 50 mounted on a bracket 51 projecting from the chassis frame cross member 52. The pulley 48 is mounted on the chassis frame by means of a bracket 51a.

The lower lap of the upper cable means 49 is anchored at 53, to the upper portion of the carrier 5. By turning the shaft 46 by the manipulation of the handle 47, the anchorage point 53 may be moved forwardly toward the king pin B of the trailer frame. This shifts the carrier 5 forward and with it the pulleys 43 and 44. The upper lap of the cable means 42 is anchored to the cross piece 52 at 54, and since the pulleys 43 and 44 are moved bodily, the lower lap of the cable means 42 floats forward exerting a pull upon the bracket 14 and lowering the supporting parts 1, 2 and 3 simultaneously with the shifting forward of the slide or carrier 5. Lock means 16, 17 and 18 and 19, similar to that described in reference to Figures 1 and 2 may be availed of in the construction of Figure 11.

Having in view the foregoing disclosure of my different constructions, it is notable that I avail of a support for the front end of the trailer when disconnected from the tractor vehicle, which support essentially includes a movable or forward and rearward shifting carrier. Upon this carrier is supported the supporting wheels of said support and actuating parts for raising and lowering the said supporting wheels. By such assemblage of parts I am enabled not only to cause the supporting wheels to be raised and lowered after the manner of usual operation of these parts to obtain clearance for the wheels and to bring the wheels to the ground, but I am also enabled to shift the entire supporting parts bodily relatively to the front end of the trailer for the purpose outlined in the statement of the invention herein.

By linking up the mechanisms in one or more of the ways which I have described, it becomes evident that the operation of the carrier means for the support is caused to be simultaneous and automatic in reference to the operation of the means for raising and lowering the parts of the support, or vice versa, the last reference to the construction in Figure 11.

It is notable that the forward bodily movement of the trailer supporting parts 1, 2 and 3, which constitute ground contacting means, adds to the stability of the trailer when disconnected from the tractor vehicle.

It is to be further understood that where cable and pulley means have been shown and described, chain and sprocket means may be substituted in lieu thereof, giving an absolutely positive action to the shiftable parts; or as a further optional substitute in the cable forms, a cable drum may be employed at the driving end and the middle part of the cable wound on the drum fixed thereto so as to be unwound from and wound onto the cable drum incident to actuation of the crank for shifting the parts.

Having thus described my invention, what I claim as new and desire to secure by Letters Patent of the United States, is:—

1. In combination, a trailer vehicle, having its front end adapted to be supported by a tractor vehicle, and supporting means for the trailer vehicle to support the front end thereof when it is disconnected from the tractor vehicle, said supporting means comprising a carrier, sliding connections between the said carrier and the trailer frame, ground contacting supporting parts mounted on the carrier and foldable in respect thereto in order to be elevated and lowered, and means for actuating said ground contacting supporting parts independently of any movement of the carrier.

2. In combination, a trailer vehicle, comprising a frame, a slide carrier movably mounted to shift back and forth relatively to the front end of the frame, ground contacting supporting means on said carrier and foldable to raise and lower relatively to the ground surface, screw means raising and lowering the ground contacting means, and connections between said screw means and the carrier to simultaneously move the carrier.

3. In combination, a trailer vehicle, comprising a frame, a slide carrier movably mounted to shift back and forth relatively to the front end of the frame, ground contacting supporting means on said carrier and foldable to raise and lower relatively to the ground surface, cable and pulley means for raising and lowering the ground contacting means, and connections between said cable and pulley means and the carrier for shifting the carrier simultaneously with raising and lowering of the ground contacting means.

4. In combination, a trailer vehicle, comprising a frame, a slide carrier movably mounted to shift back and forth relatively to the front end of the frame, ground contacting supporting means on said carrier and foldable to raise and lower relatively to the ground surface, screw means raising and lowering the ground contacting means, connections between said screw means and the carrier to simultaneously move the carrier, said screw means comprising a screw on the carrier connected to the ground contacting means, and a screw connected with said screw means and the frame of the trailer for causing the movement of the carrier at the time of movement of the ground contacting means.

5. In a trailer of the class described, including a frame having wheels at one end permanently supporting the same and at the other end a temporary or auxiliary support, means for mounting said temporary support on said trailer frame for bodily movement of the temporary support towards and away from the adjacent end of the trailer and also towards and away from the ground, said means including a carrier having substantially the form of an I-beam section, guide members secured to the trailer frame and slidably engaging the upper flange of the carrier for suspending said carrier while permitting longitudinal sliding movements of the carrier therein, means at the forward end of said carrier for guiding said forward end and sustaining the weight thereof as said carrier is moved forwardly and withdrawn from the guide members aforesaid, means pivotally connecting said temporary support to said carrier, and means for actuating said support about its pivot on the carrier to dispose the support in or out of position for engagement with the ground.

6. In a trailer of the class described, including a frame having wheels at one end permanently supporting the same and at the other end a temporary or auxiliary support, means for mounting said temporary support on said trailer frame for bodily movement of the temporary support towards and away from the adjacent end of the trailer and also towards and away from the ground, said means including a carrier having substantially the form of an I-beam section, guide members secured to the trailer frame and slidably engaging the upper flange of the carrier for suspending said carrier while permitting longitudinal sliding movements of the carrier therein, means at the forward end of said carrier for guiding said forward end and sustaining the weight thereof as said carrier is moved forwardly and withdrawn from the guide members aforesaid, said latter means including a transversely extending member rigidly connected to the carrier and provided with brackets at its opposite ends on which guide rollers are mounted for engagement with cooperating guide channels in the trailer frame, means pivotally connecting said temporary support to said carrier, and means for actuating said support about its pivot on the carrier to dispose the support in or out of position for engagement with the ground.

7. In a trailer of the class described, including a frame having wheels at one end permanently supporting the same and at the other end a temporary or auxiliary support, means for mounting said temporary support on said trailer frame for bodily movement of the temporary support towards and away from the adjacent end of the trailer and also towards and away from the ground, said means including a carrier having substantially the form of an I-beam section, guide members secured to the trailer frame and slidably engaging the upper flange of the carrier for suspending said carrier while permitting longitudinal sliding movements of the carrier therein, means at the forward end of said carrier for guiding said forward end and sustaining the weight thereof as said carrier is moved forwardly and withdrawn from the guide members aforesaid, said latter means including a transversely extending member rigidly connected to the carrier and provided with brackets at its opposite ends on which guide rollers are mounted for engagement with cooperating guide channels in the trailer frame, means pivotally connecting said temporary support to the forward end of said carrier, and means for actuating said support about its pivot on the carrier to dispose the support in or out of position for engagement with the ground.

8. In a trailer of the class described, including a frame having wheels at one end permanently supporting the same and at the other end a temporary or auxiliarly support, means for mounting said temporary support on said trailer frame for bodily movement of the temporary support towards and away from the adjacent end of the trailer and also towards and away from the ground, said means including a carrier having substantially the form of an I-beam section, guide members secured to the trailer frame and slidably engaging the upper flange of the carrier for suspending said carrier while permitting longitudinal sliding movements of the carrier therein, means at the forward end of said carrier for guiding said forward end and sustaining the weight thereof as said carrier is moved forwardly and withdrawn from the guide members aforesaid, means pivotally connecting said temporary support to said carrier, and means for actuating said support about its pivot on the carrier to dispose the support in or out of position for engagement with the ground, said last mentioned means including a screw shaft rotatably mounted on one side of said carrier and extending longitudinally thereof, a slide threadably mounted on said screw shaft, a member pivotally connected to said slide and to said support for translating reciprocal motion of said slide to pivotal motion of said support, and an operating shaft for said screw shaft.

9. In a trailer of the class described, including a frame having wheels at one end permanently supporting the same and at the other end a temporary or auxiliary support, means for mounting said temporary support on said trailer frame for bodily movement of the temporary support towards and away from the adjacent end of the trailer and also towards and away from the ground, said means including a carrier having substantially the form of an I-beam section, guide members secured to the trailer frame and slidably engaging the upper flange of the carrier for suspending said carrier while permitting longitudinal sliding movements of the carrier therein, means at the forward end of said carrier for guiding said forward end and sustaining the weight thereof as said carrier is moved forwardly and withdrawn from the guide members aforesaid, means pivotally connecting said temporary support to said carrier, and means for actuating said support about its pivot on the carrier to dispose the support in or out of position for engagement with the ground, said last mentioned means including a slide carried by the lower flange of said carrier and movable longitudinally therealong relatively thereto, a member pivotally connected to said slide and to said support for translating reciprocal motion of said slide to pivotal motion of said support, a guide pulley at each end of said carrier, a cable extending over each pulley, and means acting upon said cable whereby reciprocal motion relatively to said carrier is imparted to said slide incident to longitudinal motion of said carrier.

10. In a trailer of the class described, including a frame having wheels at one end permanently supporting the same and at the other end a temporary or auxiliary support, means for mounting said temporary support on said trailer frame for bodily movement of the temporary support towards and away from the adjacent end of the trailer and also towards and away from the ground, said means including a carrier having substantially the form of an I-beam section, guide members secured to the trailer frame and slidably engaging the upper flange of the carrier for suspending said carrier while permitting longitudinal sliding movements of the carrier therein, means at the forward end of said carrier for guiding said forward end and sustaining the weight thereof as said carrier is moved forwardly and withdrawn from the guide members aforesaid, means pivotally connecting said temporary support to said carrier, means for actuating said support about its pivot on the carrier to dispose the support in or out of position for engagement with the ground, said last mentioned means including a screw shaft rotatably mounted on one side of said carrier and extending longitudinally thereof, a slide threadably mounted on said screw shaft, a member pivotally connected to said slide and to said support for translating reciprocal motion of said slide to pivotal motion of said support, and an operating shaft for said screw shaft, and means actuated responsively to actuation of said slide for shifting said carrier longitudinally in its guides.

11. In a trailer of the class described, including a frame having wheels at one end permanently supporting the same and at the other end a temporary or auxiliary support, means for mounting said temporary support on said trailer frame for bodily movement of the temporary support towards and away from the adjacent end of the trailer and also towards and away from the ground, said means including a carrier, slidable connections intermediate said carrier and said trailer frame permitting sliding movements of said carrier relatively to said trailer frame, means pivotally connecting said temporary support to said carrier, manually operable means for actuating said support about its pivot on the carrier to dispose the support in or out of position for engagement with the ground, and means for imparting sliding movement to said carrier responsive to actuation of said temporary support.

12. In a trailer of the class described, including a frame having wheels at one end permanently supporting the same and at the other end a temporary or auxiliary support, means for mounting said temporary support on said trailer frame for bodily movement of the temporary support towards and away from the adjacent end of the trailer and also towards and away from the ground, said means including a carrier having substantially the form of an I-beam section, guide members secured to the trailer frame and slidably engaging the upper flange of the carrier for suspending said carrier while permitting longitudinal sliding movements of the carrier therein, means at the forward end of said carrier for guiding said forward end and sustaining the weight thereof as said carrier is moved forwardly and withdrawn from the guide members aforesaid, means for shifting said carrier longitudinally in its guides, said last mentioned means including a rack mounted on said trailer frame at one side of said carrier, a shaft rotatably mounted on said carrier, and a pinion secured to said shaft and engaging said rack, means pivotally connecting said temporary support to said carrier, and means for actuating said support about its pivot on the carrier to dispose the support in or out of position for engagement with the ground.

13. In a trailer of the class described, including a frame having wheels at one end permanently supporting the same and at the other end a temporary or auxiliary support, means for mounting said temporary support on said trailer frame for bodily movement of the temporary support towards and away from the adjacent end of the trailer and also towards and away from the ground, said means including a carrier having substantially the form of an I-beam section, guide members secured to the trailer frame and slidably engaging the upper flange of the carrier for suspending said carrier while permitting longitudinal sliding movements of the carrier therein, means at the forward end of said carrier for guiding said forward end and sustaining the weight thereof as said carrier is moved forwardly and withdrawn from the guide members aforesaid, means for shifting said carrier longitudinally in its guides, said last mentioned means including a rack mounted on said trailer frame at one side of said carrier, a shaft rotatably mounted on said carrier, and a pinion secured to said shaft and engaging said rack, means pivotally connecting said temporary support to said carrier, and means for actuating said support about its pivot on the carrier to dispose the support in or out of position for engagement with the ground, said latter means comprising a pulley fixed to said shaft, another pulley mounted on said carrier, a cable extending about said pulleys, a slide mounted on the lower flange of said carrier for relative movement therealong, said slide being secured to said cable, and a member pivotally connected to said slide and to said temporary support for translating reciprocal motion of said slide to pivotal motion of said support.

14. In a trailer of the class described, including a frame having wheels at one end permanently supporting the same and at the other end a temporary or auxiliary support, means for mounting said temporary support on said trailer frame for bodily movement of the temporary support towards and away from the adjacent end of the trailer and also towards and away from the ground, said means including a carrier, slidable connections intermediate the carrier and the trailer frame permitting sliding movement of the carrier relatively to the trailer frame, means pivotally connecting said temporary support to said carrier, manually operable means for imparting sliding movement to said carrier to shift the carrier towards and away from the end of the trailer, and means actuated responsively to shifting movements of the carrier for actuating said temporary support about its pivot on the carrier to dispose the support in and out of position for engagement with the ground respectively.

15. In a trailer of the class described, including a frame having wheels at one end permanently supporting the frame and at the other end a temporary or auxiliary support, means for mounting said temporary support on said trailer frame for bodily movement of the temporary support towards and away from the adjacent end of the trailer and also towards and away from the ground, said means including a carrier having substantially the form of an I-beam section, guide members secured to the trailer frame and slidably engaging the upper flange of the carrier for suspending said carrier while permitting longitudinal sliding movements of the carrier therein, means at the forward end of said carrier for guiding said forward end and sustaining the weight thereof as said carrier is moved forwardly and withdrawn from the guide members aforesaid, means pivotally connecting said temporary support to the carrier, means for actuating said support about its pivot on the carrier to dispose the support in or out of engagement with the ground and for shifting said carrier longitudinally in its guide, said means including a pair of pulleys, a cable extending about said pulleys, and actuating means therefor whereby actuation thereof effects shifting of said carrier simultaneously with said support.

EDWIN HOWE ALLEN.